United States Patent
Hale et al.

(10) Patent No.: US 11,520,832 B2
(45) Date of Patent: Dec. 6, 2022

(54) DYNAMIC MANAGEMENT SYSTEM FOR NOTIFICATION AND RESPONSE TO EMERGENT EVENTS

(71) Applicant: Disney Enterprises, Inc., Burbank, CA (US)

(72) Inventors: Gregory Brooks Hale, Orlando, FL (US); David Benson Gilmore, II, Saint Cloud, FL (US)

(73) Assignee: Disney Enterprises, Inc., Burbank, CA (US)

( * ) Notice: Subject to any disclaimer, the term of this patent is extended or adjusted under 35 U.S.C. 154(b) by 75 days.

(21) Appl. No.: 16/875,664

(22) Filed: May 15, 2020

(65) Prior Publication Data

US 2021/0357456 A1 Nov. 18, 2021

(51) Int. Cl.
*G06F 16/9035* (2019.01)
*G01W 1/10* (2006.01)
*G06F 16/906* (2019.01)

(52) U.S. Cl.
CPC .......... *G06F 16/9035* (2019.01); *G01W 1/10* (2013.01); *G06F 16/906* (2019.01)

(58) Field of Classification Search
CPC ..... G06F 16/9035; G06F 16/906; G01W 1/10
USPC ...................................................... 707/722
See application file for complete search history.

(56) References Cited

U.S. PATENT DOCUMENTS

| | | | |
|---|---|---|---|
| 10,367,911 B1 * | 7/2019 | Combs | G06F 16/9535 |
| 2008/0071465 A1 * | 3/2008 | Chapman | G08G 1/0104 |
| | | | 701/117 |
| 2018/0181901 A1 * | 6/2018 | Babcock | H04L 67/306 |
| 2019/0333071 A1 * | 10/2019 | Degeneffe | G06Q 10/1091 |
| 2020/0037125 A1 * | 1/2020 | Neuert | G08G 1/00 |
| 2020/0210918 A1 * | 7/2020 | Brand | G06Q 10/20 |

OTHER PUBLICATIONS

Rabinowitz, Henry, et al., "NYNEX MAX: A Telephone Trouble Screening Expert", IAAI-91 Proceedings, AAAI (www.aaai.org), © 1991, pp. 213-230.*

* cited by examiner

*Primary Examiner* — Robert Stevens
(74) *Attorney, Agent, or Firm* — Patterson + Sheridan, LLP (57) ABSTRACT

Embodiments disclosed herein provide techniques for dynamic response management. Weather data for a geographic region is received, and a state of the geographic region is determined based on the weather data. A first predefined rule of a plurality of predefined rules is identified based on the determined state of the geographic region. A first role of a first user is determined. A first instruction is then generated for the first user based on the first predefined rule and the first role, where the first instruction comprises one or more actions. The first instruction is then transmitted to the first user.

20 Claims, 8 Drawing Sheets

DYNAMIC MANAGEMENT SYSTEM FOR NOTIFICATION AND RESPONSE TO EMERGENT EVENTS

BACKGROUND

Emergent situations, such as changes in weather, accidents, emergencies, and the like, often call for targeted and timely responses. However, there are no existing systems in place to automatically collect the necessary data, identify appropriate responses, and enact them. Additionally, for many events, a wide variety of data sources are often utilized, providing conflicting or confusing information. For weather events or other emergent situations, compliance with government, manufacturer, and/or operational regulations can be a significant challenge. To effectively respond to new situations, personnel are in need of consistent and up-to-date rules as well as actionable procedures. Existing systems require substantial manual oversight and instruction (e.g., manager to employee) to ensure procedures are followed. It is critical to provide correct information and instruction to ensure the overall health and safety of the community.

SUMMARY

According to some embodiments of the present disclosure, a method is provided. The method includes receiving weather data for a geographic region, and determining, by operation of one or more computer processors, a state of the geographic region based on the weather data. The method further includes identifying a first predefined rule of a plurality of predefined rules based on the determined state of the geographic region. Additionally, the method includes determining a first role of a first user. The method also includes generating a first instruction for the first user based on the first predefined rule and the first role, wherein the first instruction comprises one or more actions, and transmitting the first instruction to the first user.

According to some embodiments of the present disclosure, a non-transitory computer-readable medium is provided. The non-transitory computer-readable medium contains computer program code that, when executed by operation of one or more computer processors, performs an operation. The operation includes receiving weather data for a geographic region, and determining a state of the geographic region based on the weather data. The operation further includes identifying a first predefined rule of a plurality of predefined rules based on the determined state of the geographic region. Additionally, the operation includes determining a first role of a first user. The operation also includes generating a first instruction for the first user based on the first predefined rule and the first role, wherein the first instruction comprises one or more actions, and transmitting the first instruction to the first user.

According to some embodiments of the present disclosure, a system is provided. The system includes one or more computer processors, and a memory containing a program which, when executed by the one or more computer processors, performs an operation. The operation includes receiving weather data for a geographic region, and determining a state of the geographic region based on the weather data. The operation further includes identifying a first predefined rule of a plurality of predefined rules based on the determined state of the geographic region. Additionally, the operation includes determining a first role of a first user. The operation also includes generating a first instruction for the first user based on the first predefined rule and the first role, wherein the first instruction comprises one or more actions, and transmitting the first instruction to the first user.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments of the present disclosure provide systems and techniques to collect and analyze a variety of data to generate specific and actionable instructions that facilitates rapid and accurate response to changing circumstances. In some embodiments, the system utilizes the location of ongoing or emergent events or situations (e.g., weather conditions), such as defined using geo-fenced areas, to identify affected users for a given situation. For example, based on the user's location or planned future location (e.g., determined based on the location of the user's phone or other device), the system can enable users to receive specific and role-specific alerts connected to the particular location(s) where the user needs to be notified. In one embodiment, the system provides targeted and real-time (or near real-time) weather information, and connects the data with actionable rules for the location, equipment, and/or operations being monitored. In an embodiment, this information can then be reported out consistently to all relevant users, tailored for the user's specific role. In embodiments, these user hierarchies can enable the system to provide end users with the information necessary to keep leadership, personnel, and customers safe during ongoing events.

Although weather data and events are used as examples in some aspects of this disclosure, embodiments of the present disclosure are readily applicable to any situations, events, or circumstances that benefit from rapid and targeted response.

For example, in response to a lightning storm, the system can drive swift and complete shutdown of outdoor areas (e.g., by identifying affected operations), and notify and instruct personnel and guests (e.g., based on their roles and locations at the time). As another example, in response to a medical emergency (e.g., a person collapsing in a public area), the system can identify relevant personnel (e.g., medical responders with the appropriate training and equipment, and located in the area) and provide specific and targeted instructions (e.g., whether an automated external defibrillator (AED), bleed control kit, oxygen, First Aid kit, or other supplies or tools should be brought when responding to the event). In some embodiments, the system can also allow the trained responders to acknowledge whether they are responding, such that the alert can be sent to a wider geographic area to identify additional responders.

In some embodiments, the system can similarly be applied for security-related events. In one such embodiment, all parties (e.g., security or operational personnel) can receive specific rules and/or instructions related to their role, location, responsibility, training, type of event, and procedures. In one embodiment, the system will also notify bystanders, guests, and/or planned visitors in the area. Similarly, in some embodiments, the system can identify notify users based on defined/planned routes (e.g., delivery companies, guests, scheduled personnel, and the like).

In embodiments of the present disclosure, the term user may refer to a manager or leader that instructs/manages employees and personnel, an administrator that establishes the rules and responses, employees or personnel who implement the needed actions, guests or customers in the area, and the like. For example, in response to identifying a concern, the system may notify and instruct a leader about the event, the relevant rule(s), and the affected operations or areas. Upon receiving a response from the leader(s), the affected personnel can be automatically provided with the specific procedures (e.g., closing and/or opening procedures) and actions they should take.

In some embodiments, the system relies on a rules engine developed based on a variety of relevant data sources, including government regulations, manufacturer requirements or suggestions, historical and/or operational restrictions, and the like. In some embodiments, the rules engine further integrates user-configured restrictions based on unique equipment or operations. In an embodiment, each rule is coupled with one or more procedures relating to information distribution, specified actions for preparation, closure, and/or reopening, and the like.

In an embodiment, the rules engine is self-configurable and allows users to define the parameters of the location(s) they would like to monitor. For example, each user may manually specify particular attractions, operations, and/or areas they would like alerts for. In some embodiments, the rules engine can further provide suggestions on rules based on government regulations, manufacturer requirements, and the like. Administrators may input or select relevant rules, as well as the corresponding action(s) for a given rule, such as shutdown procedures and reopening procedures for weather events. In some embodiments, the system allows users to select points/areas on a map, in order to define boundaries for the alerts that will be generated. For example, the administrator(s) may specify specific areas for a given rule/action and/or the different equipment within that area, and the system will output the specific alerts/actions to users within that defined area.

In this way, in some embodiments, users can define rules based on chosen points/areas on the map. For example, the user may drop a pin on an operation or area. As used herein, an operation can include any area, region, structure, equipment, or other physical element or space, including but not limited to a shopping area, an attraction, a ski lift, a pool, a golf course, an wedding space, a crane or roof of a building under construction, a shipping yard, an sports stadium, a parking lot, a shipping route, a marathon route, a festival, a parade, a graduation ceremony location, a funeral, an airport, a resort, a sporting event, a filming crew location, a ride such as a log flume or roller coaster, a show or theater area, multiple points along a defined route, and the like. Each such location can then be connected to rules and alerts which can be distributed as needed to employees and guests who are inside of the defined boundary, and/or who have plans to visit the defined boundaries. In some embodiments, users who have a vested interest in being informed, such as decision-makers and employees, can also be included in the alert process regardless of their location.

In embodiments, once the system is deployed, users can receive real-time information in a wide variety of ways. For example, users may receive alerts via mobile devices, tablets, laptops, desktop computers, pre-existing system(s), and the like. In an embodiment, the system generates multiple user interfaces (UIs); one for each role/type of user. For example, the system may generate a first UI for decision makers and those with a leadership role (or those who perform the actual shutdown and/or reopening procedures), and a second UI for guests/customers. In one such embodiment, weather alerts are generated for a given user based in part the user's role, and/or the location of the user/user device. For example, suppose some construction workers are operating a crane and working on the roof of a new building, while others are working inside of the building. A custom alert can be generated for each of the users based on their role (e.g., whether they are a crane operator or an interior craftsman). This allows the users to receive the information they need to know, without providing information that is not relevant to their role. Such users can thus receive specific and actionable instructions about how to proceed (e.g., how to shut down the crane safely for an incoming storm).

In some embodiments, the UI generated for guests/customers can include information regarding which locations/attractions/operations are operating, why a given location is not operating, and the like. In one embodiment, the UI can also offer alternative areas or attractions the user could visit. Similarly, in some embodiments, the guest UI may provide instructions for safety, alternative transportation, indoor activities, and the like. In some embodiments, these instructions/suggestions are similarly personalized for the user. For example, if a given operation is closed, the system may identify and suggest similar alternatives. Further, if the recommended action is to take cover from a storm, the system may identify an appropriate shelter (e.g., based on the user's location), and indicate this particular location for the user.

Embodiments of the present disclosure are widely applicable to a variety of implementations. For example, at a ski/mountain resort, critical weather safety information can be provided at all times. The system can be utilized to guide employees (e.g., ski patrol) to the position of fallen or injured guests, critical weather updates can be provided, avalanche warnings may be implemented, wind chill instructions can be transmitted, and the like. A wide variety of other information and data can be provided. As another example, the system may be deployed on a cruise line, and provide updated alerts and information relating to itineraries, inclement weather, and the like.

Figure 1:
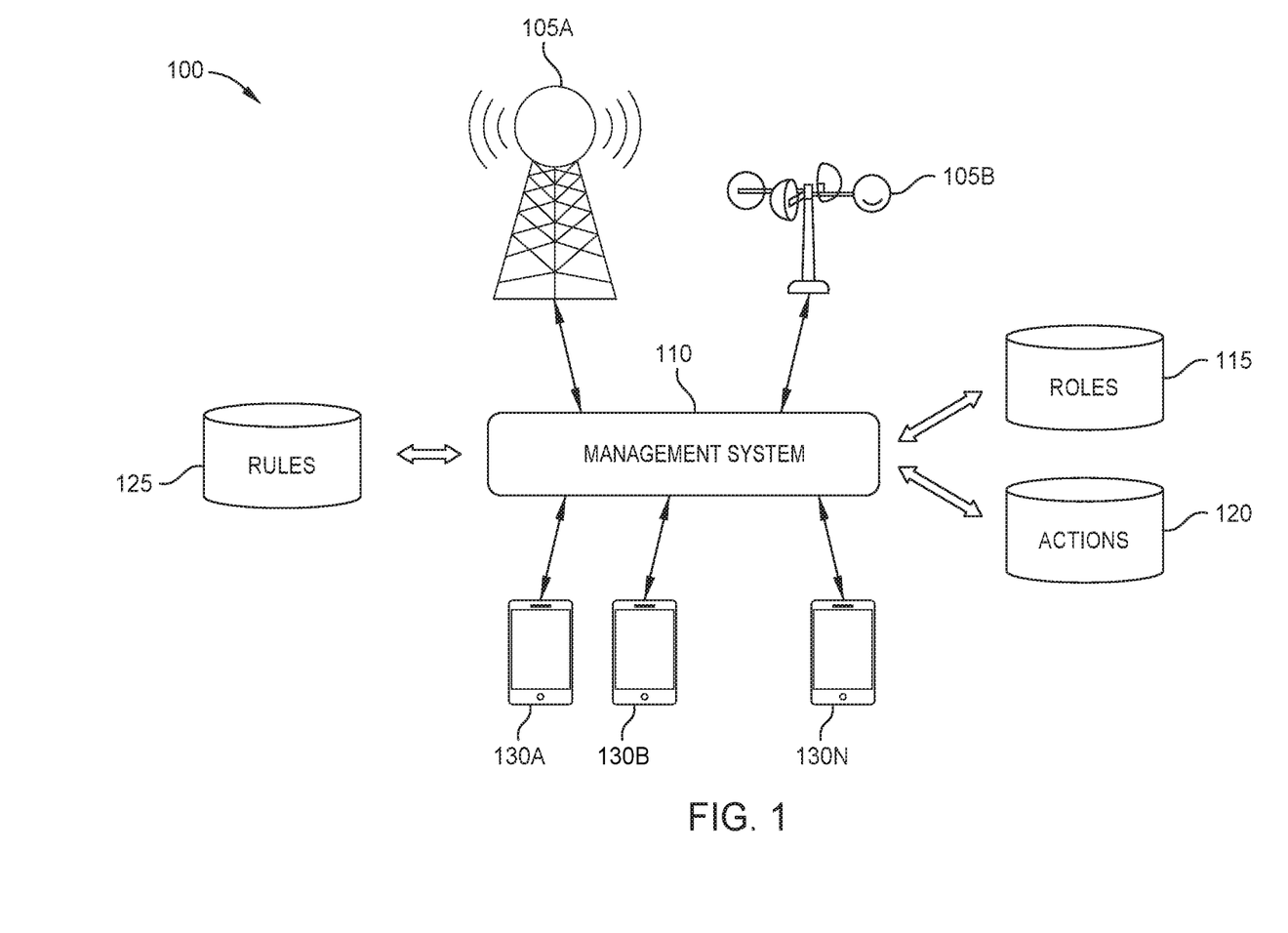
FIG. 1 depicts an environment configured to evaluate emergent data and initiate actionable and specific responses, according to one embodiment disclosed herein.

FIG. 1 depicts an environment 100 configured to evaluate emergent data and initiate actionable and specific responses, according to one embodiment disclosed herein. In the illustrated embodiment, a Management System 110 interacts with a wide variety of data and information sources in order to provide specific, actionable, and role-specific suggestions and instructions to a wide variety of users. As illustrated, the Management System 110 can receive weather information or other emergent data from a wide variety of Data Sources 105. In the illustrated embodiment, the Data Sources 105 include a Doppler radar 105A and an Anemometer 105B. Of course, in embodiments, any number and variety of Data Sources 105 may be utilized, including rain gauges, weather vanes, and the like. In some embodiments, in addition to or instead of such "raw" data sources, curated sources such as weather services can also be utilized. Of course, although the illustrated Data Sources 105 are related to weather, in embodiments, the system can similarly utilize Data Sources 105 relating to any number of uses and emergent events, such as data relating to injuries or accidents.

In the illustrated embodiment, the Management System 110 utilizes the information provided by the Data Sources 105 to determine the current and/or future state of one or more areas/regions. For example, the Management System 110 may determine the weather conditions, ongoing or upcoming events, and the like. Based on the current and/or future conditions, the Management System 110 can provide targeted and specific instructions to User Devices 130A-N. In one embodiment, the Management System 110 searches a corpus of Rules 125 (or queries a rules engine) to identify rule(s) that are relevant to the determined states/conditions. In one embodiment, each Rule 125 can specify the states/conditions to which it pertains.

For example, upon determining that a lightning storm is incoming, the Management System 110 may identify Rule(s) 125 that relate to/indicate that they are relevant for lightning and/or storms. In some embodiments, each Rule 125 can similarly be associated with particular operations/areas/regions/attractions. In one such embodiment, the Management System 110 further identifies Rule(s) 125 that are relevant for the determined state(s) and area(s) where the states/conditions are expected. In the illustrated embodiment, the Management System 110 utilizes the Rule(s) 125 to identify the appropriate Action(s) 120 for the determined conditions.

In one embodiment, each Rule 125 specifies which Action(s) 120 are relevant if the Rule 125 is violated/implicated. For example, a Rule 125 may specify that if lightning is detected within ten miles of a given attraction, the appropriate Action 120 is to shut down the operation. In some embodiments, the Actions 120 may be more specific/tailored to the area/attraction. For example, in addition to determining that a given attraction should be shut down, the Management System 110 may identify specific steps/instructions about how to appropriately close the attraction. In embodiments, the Actions 120 can include any number and variety of instructions, including shutting down operations, opening operations, rerouting guests, announcements that should be made (e.g., informing employees with respect to what they should tell the guests), and the like.

Further, the Actions 120 may include instructions such as where the user(s) should go (e.g., to shelter from a storm), items to bring along with them (e.g., "bring an umbrella because rain is expected"), and the like. Once the relevant Rule(s) 125 and/or Action(s) 120 have been identified for the determined state, the Management System 110 can generate role-specific and specific instructions for each user based on the Roles 115. In some embodiments, the Roles 115 can incorporate hierarchies for an organization (e.g., job titles and defined supervisors/personnel). For example, based on the Roles 115, the Management System 110 may determine whether the user associated with a given User Device 130 is a manager or employee. In some embodiments, the Roles 115 also specify if the user is a guest/customer. In other embodiments, the Management System 110 may classify the user as a guest/customer if they are not reflected in the Roles 115.

In at least one embodiment, the role of a given user is further determined based on their location and/or actions. For example, based on preexisting reservations, the Management System 110 may determine that a given user is a guest of one or more specific operations, rather than a generic guest. This can allow the system to tailor the instructions at a more granular level. In an embodiment, to generate these informational messages, the Management System 110 identifies User Device(s) 130A-N that are within the affected area(s) for the determined state/rules.

For example, using a Global Positioning System (GPS) or other location data, the Management System 110 can determine which User Device(s) 130 should receive a given update. In some embodiments, this determination is based not only on the current location, but also based on planned future location(s) (e.g., determined based on reservations or other stated plans). If the Management System 110 determines that a given user plans to visit a location later, the Management System 110 may determine to transmit specific instructions to the user even if other users in the area do not receive instruction. For example, if the alert is relevant for guests at a given restaurant, the Management System 110 may identify a given user as affected based on determining that the user plans to visit the restaurant, even if they are not yet there. In an embodiment, based on the Role 115 of the user/User Device 130, the Management System 110 generates and provides specific instructions and information.

In at least one embodiment, the system can generate and provide information for other entities, such as a company shipping multiple packages to a defined geographic location. When there is a weather event impacting routes, in some embodiments, the system can deliver specific instructions (such as re-routing deliveries to large indoor buildings with multiple drop-offs) until the weather event clears. In one embodiment, the system can also re-route shipping locations based on impending or coming weather events in order to efficiently complete deliveries for a region on a route that may be impacted by weather later in the day.

Figure 2A:
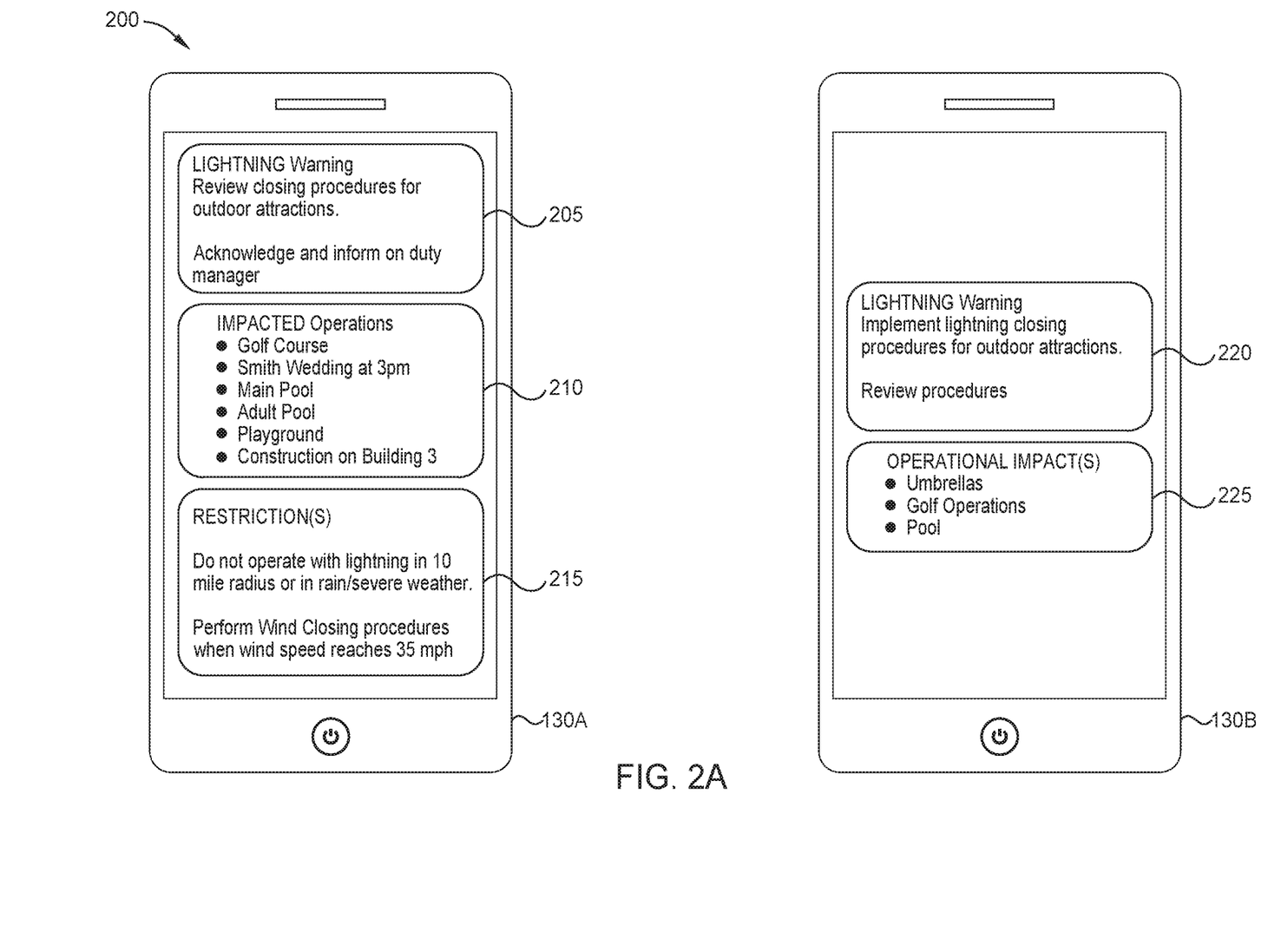
FIGS. 2A and 2B depict a number of user devices outputting role-specific interfaces with actionable instructions, according to one embodiment disclosed herein.
Figure 2B:
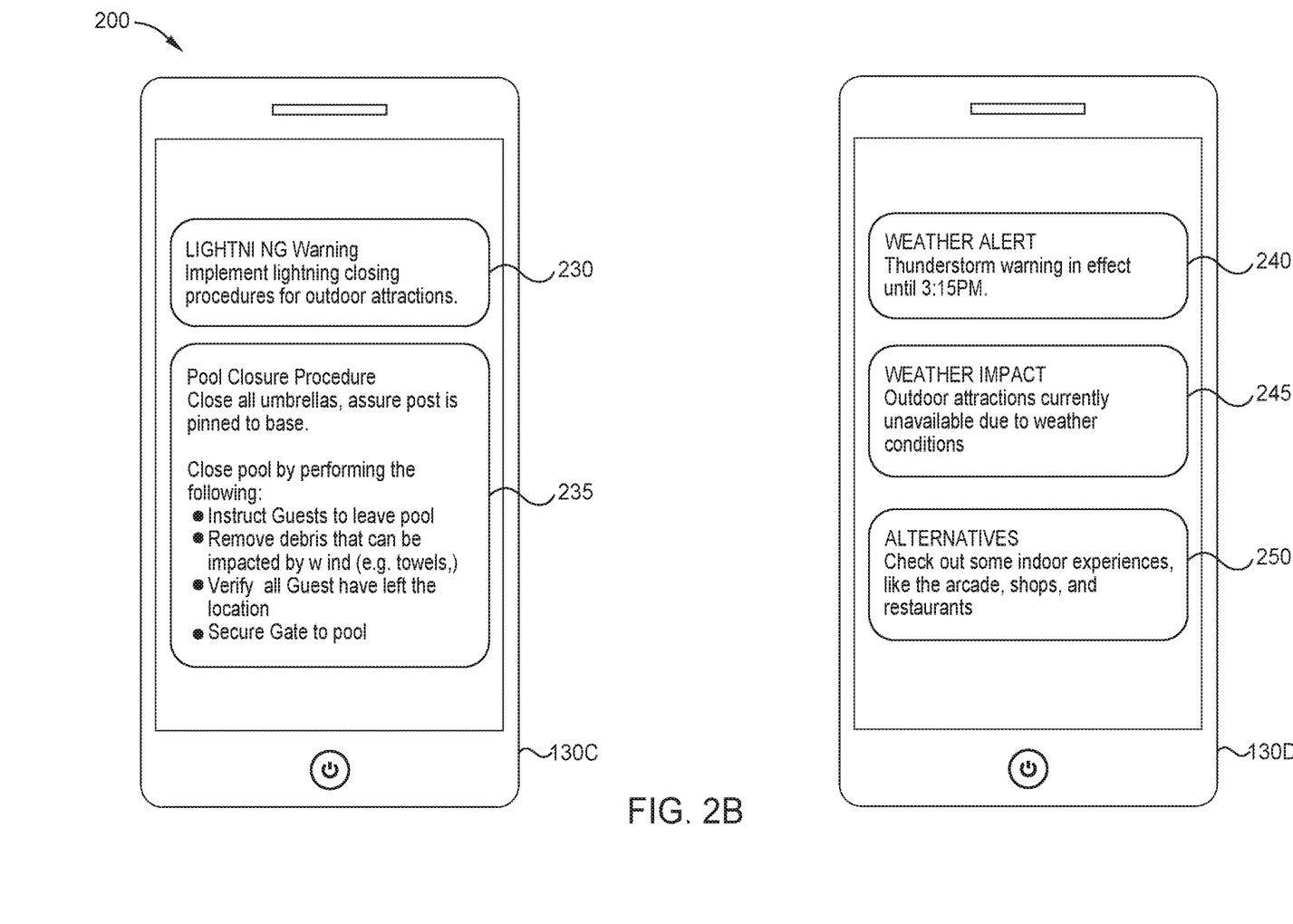

FIGS. 2A and 2B depicts a number of User Devices 130 outputting role-specific interfaces with actionable instructions, according to one embodiment disclosed herein. In the illustrated embodiment, the User Device 130A is associated with a leader/manager, the User Devices 130B and 130D are associated with an employee or other personnel, and the User Device 130C is associated with a guest/customer. In the depicted environment 200, the Management System 110 has determined that lightning has occurred within ten miles, and has thus identified relevant rule(s) and affected operation(s) and user(s). The system then generated and transmitted the depicted instructions to each user.

The User Device 130A, belonging to a leader/manager, is instructed to output specific procedures to be reviewed by the leader before the operation(s) are impacted. For example, as illustrated, a first Notification 205 informs the leader about the events/states/conditions, and provides a link for the leader to acknowledge the notification and alert the relevant manager(s)/personnel. Further, the Notification 210 specifies which attraction(s)/area(s)/operations are affected by the current state. In some embodiments, the user can select the operations in the Notification 210 to view additional detail or information, such as identities of the personnel responsible for the operation, the location of the attraction, and the like.

Further, in the Notification 215, the leader can view the specific rule(s) that was implicated by the determined environmental state for each impacted operation. In the illustrated embodiment, the rule specifies that the operation(s) should not be operated when lightning is within ten miles, or if there is rain or other severe weather. This Notification 215 can provide the leader with a more detailed understanding of the rules and impact, in order to better determine how to proceed. In an embodiment, once the leader acknowledges the impacts/rule violations, the Management System 110 can generate and transmit an update to the affected personnel, via the User Device 130B.

In the illustrated embodiment, the User Device 130B similarly outputs a set of targeted and actionable instructions to the user. In one embodiment, the information transmitted to the User Device 130B is selected based at least in part upon determining that identity/role of the corresponding user. For example, when the leader acknowledges the weather condition, the Management System 110 can automatically identify the affected employees, such as by identifying the personnel currently staffing any affected operations. Additionally, as depicted in the Notification 220, the Management System 110 provides specific and actionable instructions. This includes identifying the relevant environmental condition/rule, as well as the corresponding action(s) the user should take.

Further, as illustrated, the Notification 220 provides a link to the specific shutdown procedures to be used for the carousel. In some embodiments, this can include linking the user to the specific section(s) of a user manual or other handbook that are relevant for the needed action(s). Thus, rather than simply instructing a user to close the attraction and/or providing a link to the user guide, the Management System 110 can provide specific and pinpointed links that allow the user to quickly and accurately identify the proper procedures for the given weather condition(s). As illustrated by Notification 225, the Management System 110 further informs the user about all affected operations. This can allow the user to be better informed, and to better respond to guests or customers who may have questions about what is still open.

In the illustrated embodiment, the User Device 130C is similarly associated with an employee or other personnel. Specifically, the User Device 130C is associated with an employee who manages or operates a pool in the area. As illustrated in the Notification 230, the user is provided with a link to specific shutdown procedures, as well as an indication of the implicated rule(s)/condition(s). Further, in Notification 235, the system instructs the user regarding the specific and discrete actions to be taken to close the pool. In the illustrated embodiment, this includes closing umbrellas, instructing guests to leave the area, removing debris, verifying guests have left, and securely closing the area.

In the depicted embodiment, the User Device 130D belongs to a guest or customer. As illustrated, the User Device 130D does not receive specific information about the implicated rule(s) and action(s) that need to be taken, as this information is not relevant to the user. Instead, the Management System 110 provides higher-level updates about conditions and closures, and refrains from transmitting the detailed rules (e.g., relating to the ten mile radius) or procedures (e.g., the closing check list for the carousel). Specifically, in the illustrated embodiment, the Notification 240 is a weather alert indicating, to the user, what the current/future conditions are. Further, as depicted in Notification 245, the Management System 110 informs the guest that outdoor operations are unavailable. In some embodiments, the Management System 110 can specifically identify affected attractions. In other embodiments, the Management System 110 can broadly or collectively refer to attractions (e.g., "all outdoor attractions").

Additionally, in the Notification 250, the Management System 110 has identified and provided suggested alternatives for the user. In some embodiments, the Management System 110 does so by identifying unaffected or operational attractions, and selecting from this set. This selection may be based on a variety of factors, including known or inferred preferences of the user, prior activities of the user (e.g., which attractions they have or have not visited, or how often they have visited a given attraction), the current location of the user, and the like.

In this way, the Management System 110 can provide specific and actionable information to each individual user based on their location and/or role. While leaders/managers receive and evaluate high-level information about current conditions and applicable restrictions, they need not be flooded with detailed closure procedures (e.g., checklists) for every affected area. Similarly, while each employee needs (and receives) detailed information about how to close the operation(s) they operate, they need not receive (and do not receive) such detail for other attractions which they are not operating. Further, customers can receive specific instructions (such as to seek shelter), as well as targeted alternative suggestions when attractions are closed. This greatly improves the overall functionality of the system and the experience of each user.

Figure 3:
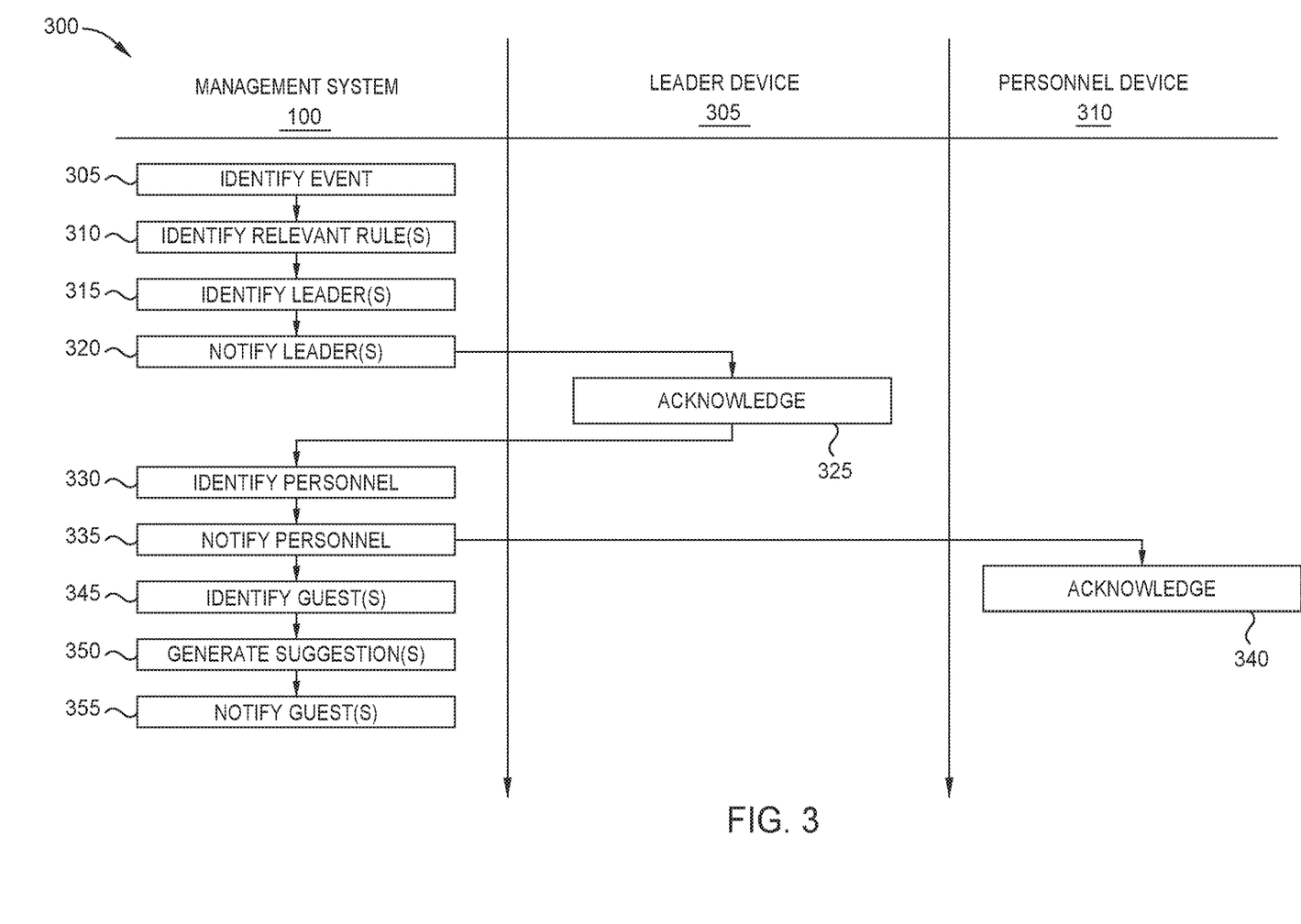
FIG. 3 depicts a workflow for data analysis and role-specific instruction generation and distribution, according to one embodiment disclosed herein.

FIG. 3 depicts a workflow 300 for data analysis and role-specific instruction generation and distribution, according to one embodiment disclosed herein. In the illustrated workflow, a Management System 100 communicates with a Leader Device 305 and a Personnel Device 310 to communicate instructions and alerts. Although a single Leader Device 305 and Personnel Device 310 are depicted, in embodiments, there may of course be any number of leader devices and/or personnel devices involved in a given implementation. The workflow 300 begins at block 304, when the Management System 100 identifies an event or other emerging situation. In some embodiments, the Management System 100 does so by receiving, aggregating, and evaluating data from a number of sources, which can include raw data (e.g., current temperature) and/or structured data (e.g., forecasts).

In one embodiment, the event corresponds to weather conditions, such as current or predicted temperatures, wind conditions, natural disasters, precipitation, humidity, and the like. In various embodiments, the event can include other occurrences such as injuries and/or accidents, service needs (e.g., a customer requesting assistance), and the like. Generally, the identified event(s) can include any state or condition (including a change in state or condition). Upon identifying or detecting the event, the workflow 300 continues to block 310 where the Management System 100 identifies a set of relevant rules for the identified event. In some embodiments, the Management System 100 searches a set of predefined rules specifying particular restrictions or other actions to be taken upon the occurrence of particular events, states, or conditions.

For example, a first rule may indicate that a first operation should be closed when winds exceed twenty miles per hour in the area, while a second rule indicates that a second operation can remain open until the winds reach thirty miles per hour. In embodiments, these rules can be defined manually (e.g., by administrators or users), and/or may be generated based on manufacturer information, governmental regulation, enterprise policy, and the like. In some embodiments, the rules further specify or link to the particular procedures and/or steps to be followed to accomplish the action(s). For example, rather than simply indicating that an attraction should be closed, the rule may further link to or specify the particular steps and ordering to ensure the attraction is properly and safely closed down.

In one embodiment, identifying the set of relevant rules from the entire corpus of rules includes identifying and retrieving rules that specify the determined event or state (e.g., that specify wind conditions) as an input condition. In an embodiment, the set of relevant rules is determined by identifying rules which are violated by the current conditions. That is, in response to identifying high winds, the Management System 100 may identify a subset of rules that would be violated by the determined wind speed, rather than all wind-related rules. In some embodiments, the Management System 100 further identifies relevant rules based on their locality. For example, if lightning is detected, the Management System 100 may determine the location of the strike, and identify lightning-related rules that are associated with operations in the vicinity of the strike. If the rule specifies that it applies to lightning strikes within six miles and the strike was ten miles from the location of the corresponding attraction, the Management System 100 may determine that the rule is not violated, implicated, and/or relevant.

Once the relevant rule(s) are identified, the workflow 300 continues to block 315, where the Management System 100 identifies one or more leaders or managers that are relevant for the rule(s). In one embodiment, a rule can specify the user(s) that should be notified if it is violated. In some embodiments, the rule may specify to notify the manager or leader that is currently in charge of the operation/area as of the time when the rule is implicated. The Management System 100 may then evaluate one or more other resources (such as staffing schedules, enterprise hierarchies, and the like) to identify the particular leader(s) that should be notified.

In some embodiments, identifying the relevant leader(s) further includes identifying the Leader Device(s) 305 associated with the relevant leader(s). For example, the rule may identify the device(s) that the notifications/instructions should be sent to (e.g., because the manager of the attraction always uses that computer console). Alternatively, based on the determined identity of the user, the Management System 100 may identify device(s) associated with the leader(s), and transmit updates to these particular devices.

At block 320, the Management System 100 notifies the determined leader(s) about the event(s), rule(s), and/or violation(s). For example, in one embodiment, the Management System 100 provides the text of (or a link to) the implicated rule(s), specifies the determined event(s), and/or indicates the affected operation(s). In some embodiments, the Management System 100 can further provide additional information immediately or upon request, such as more details about the rule(s), event(s), and/or attraction(s), the identity of any personnel and/or guests that will be affected, and the like. At block 325, the leader (via the Leader Device 305) acknowledges the notification/instruction.

In some embodiments, this acknowledgement indicates that the notification was received and read. In another embodiment, the acknowledgement indicates that any specified actions have been accomplished or are underway. That is, the leader may review the alert(s) and take action before responding. In some embodiments, if no acknowledgement is received after a predefined interval, the Management System 100 can generate and transmit a new alert to the identified leader(s). The predefined interval may be standard across rules, or may be based on the rule itself. That is, each rule may specify an urgency and/or an allowable delay the system should wait before escalating. This renewed notification may be accompanied with higher priority or urgency, labeled differently, transmitted to one or more other devices of the leader (e.g., to the leader's smartphone, while the original notification was transmitted to the leader's desktop computer), and the like. In at least one embodiment, the Management System 100 can identify and alert one or more other users, such as superiors or alternates for the originally-identified leaders.

In some embodiments, the leader acknowledgement serves as a permission/instruction to proceed with the specified action(s). In one such embodiment, the acknowledgement may include a rejection of the action. That is, the leader may acknowledge the notification while simultaneously declining to implement the suggested actions. For example, the leader may determine that the operation is already closed (and thus no further action is necessary), or that the rule is not actually violated (e.g., because the determined event is a false-positive, or the rules have changed). In at least one embodiment, if the leader rejects one or more suggested actions, they may choose to (or be required to) include an explanation of their reasoning.

Once the determined action(s) have been acknowledged and/or approved, the workflow 300 continues to block 330, where the Management System 100 identifies the relevant personnel to carry out the action(s). That is, in a similar fashion to how the Management System 100 identifies the relevant leader(s), the Management System 100 may evaluate the rule(s) and/or action(s) to identify the specified personnel. For example, the rule and/or action may indicate that one or more operators for the attraction should be informed. The Management System 100 can then evaluate the staffing schedule and/or employee hierarchy to identify the current operator(s), and thereby identify the user(s) that should be notified.

At block 335, the Management System 100 generates and transmits one or more notifications to the identified personnel. In some embodiments, this notification includes concrete and actionable steps or procedures that should be followed to ensure the action(s) are completed successfully and in a timely manner. At block 340, the user (via the Personnel Device 310) acknowledges the instructions. In some embodiments, this acknowledgement indicates that the user received the instruction. In one embodiment, the acknowledgement indicates that the user has begun (or will shortly begin) completing the instructions. In still another embodiment, the acknowledgement indicates that the user has completed the specified action(s). Further, in at least one embodiment, the user can send an initial acknowledgement upon receipt of the instructions, followed by a second acknowledgement upon completion of the task(s).

In some embodiments, if no acknowledgement is received for a predefined period of time, and/or if a predefined period of time has elapsed without receiving confirmation that the task was completed, the Management System 100 may take a number of actions. This may include, for example, sending more urgent notifications to the identified personnel (via the same channels or via alternative channels, such as personal devices) and/or identifying one or more superiors or alternatives for the silent personnel, and transmitting a notification to the identified user(s). This can help ensure the indicated action(s) are completed quickly and accurately.

In the illustrated workflow 345, the workflow 300 proceeds to block 345 to identify the affected guests immediately (e.g., without waiting for acknowledgement from the personnel). That is, even if the operation is still open (or is in the process of shutting down), the Management System 100 may nevertheless identify and alert guests that the attraction is unavailable, so as to avoid delay. In some embodiments, identifying the relevant guests includes identifying guests that are in the vicinity of the affected operation(s) (e.g., within a predefined distance, or within the same park or other area). In at least one embodiment, the Management System 100 can further identify guests that are affected, even if they are not currently in the area. This may include, for example, evaluation of reservations, purchased tickets, scheduled events or actions the user has indicated, and the like. In this way, the Management System 100 can determine that a guest is affected because they planned to or may visit the attraction in the future, even if they are not currently present.

At block 350, the Management System 100 generates one or more suggestions for the affected guest(s). For example, if an operation is closing, the Management System 100 may identify other operations that remain open, and suggest these to the user. If an attraction is being opened, the Management System 100 may notify the user that they can return or proceed to their original plan/location. In some embodiments, these suggestions are based at least in part on the current and/or future location of the guest. For example, rather than a blanket "take shelter" from severe weather, the Management System 100 may identify specific location(s) near the user, and suggest these location(s) as the best places to shelter.

Further, in some embodiments, the suggestions can additionally or alternatively be based on the role or actions of the user. For example, when an incoming storm is detected, the rule(s) may specify that all boating guests should return to a port. Based on the type of craft the user is using, however, the best approach may differ. For example, users in sailboats or canoes may be instructed to return to the closest shore/port (determined based on the user's current location), while users utilizing powered boats can be instructed to return to the original port they departed from (or the planned port they intended to arrive at). In this way, the provided suggestions and instructions can be granular to the individual user's role, actions, and location. At block 355, the Management System 100 transmits the generated notifications/suggestions to the identified affected guests. The workflow 300 then terminates. Although depicted as being provided to guests, in some embodiments, similar evaluations can be performed to provide suggestions and instructions to other users, including leaders, personnel, and the like.

Figure 4:
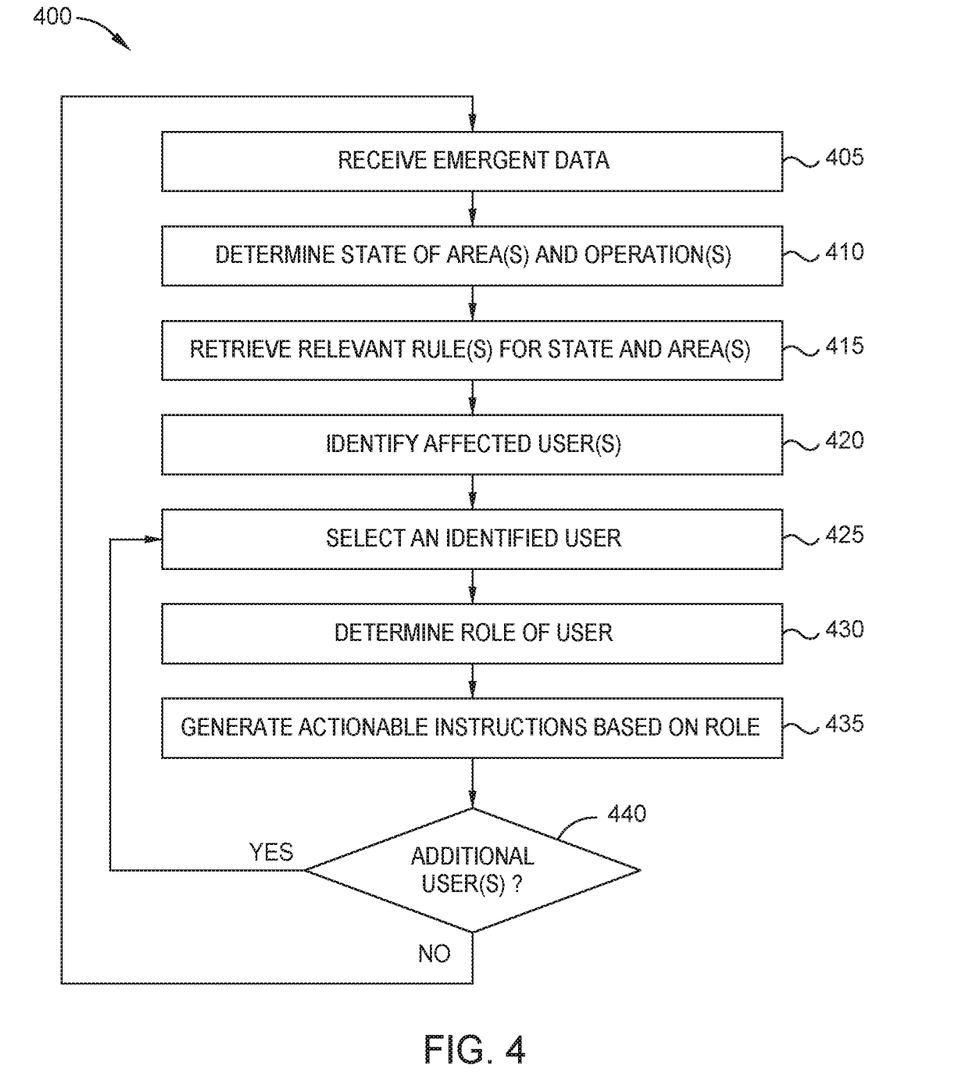
FIG. 4 is a flow diagram illustrating a method for generating actionable instructions based on a variety of data, according to one embodiment disclosed herein.

FIG. 4 is a flow diagram illustrating a method 400 for generating actionable instructions based on a variety of data, according to one embodiment disclosed herein. The method 400 begins at block 405, where a management system receives emergent data. This data can include any variety and type of data relating to emerging, future, and/or ongoing events, states, or other conditions. In one embodiment, the emergent data is weather-related data. The method 400 then continues to block 410, where the management system determines the current and/or future state of one or more areas or regions based on the received data. Continuing the above example, this may include determining current and/or future weather conditions, such as temperatures, humidity, severe weather, wind conditions, precipitation, and the like. In some embodiments, at block 410, the system further determines the current and/or future state of the operation(s) and/or attraction(s). For example, the system may determine which operations are open, identify ongoing and/or scheduled events, and the like.

At block 415, the management system identifies and retrieves a set of relevant rules for the area, based on the determined state(s). For example, if it is raining (or predicted to rain at a future time), the management system can identify a subset of predefined rules that relate to rain (e.g., actions that should be taken in the event of rain). In embodiments, these rules may be defined manually, and/or be automatically generated based on regulations, policies, user manuals, and the like. Generally, the rules indicate appropriate actions/responses to any number of emergent conditions, including but not limited to health, safety, and/or security concerns. Any given rule may be general and widely applicable (e.g., when a tornado is incoming, all individuals in the area should shelter indoors) or specific to particular attractions or areas (e.g., when wind exceeds twenty miles per hour, a particular roller coaster should be closed).

The method 400 then continues to block 420, where the management system identifies a set of user(s) that will be affected by the determined state(s) and/or the implicated rule(s). In one embodiment, this includes identifying users in the vicinity (e.g., within a predefined geographic area or within a predefined distance from one or more points) of the affected areas/operations. In some embodiments, affected users are identified based in part on their role. For example, if a rule specifies that an attraction should be closed, the management system may identify the current managers and/or operators of the attraction.

In some embodiments, the condition(s)/input for one or more rules may specify the personnel, rather than an operation or equipment. For example, outdoor workers may have restrictions relating to how long they can be exposed to the elements when the air quality, temperature, heat index, and/or wet bulb temperature reaches a predefined limit. In such an embodiment, leaders can be notified of the forecast for the day. The system may then track the duration of exposure for each individual based on their location, the last time the required action(s) were taken (e.g., from the leader), and/or the current conditions. When a limit is reached, the leader can be notified of the rules and the procedures. In some embodiments, the system requires the leader to acknowledge and perform certain actions (e.g., check on personnel every hour). When the task is performed, the system can log the information for future historical tracking.

In at least one embodiment, identifying affected users includes evaluating future plans, reservations, or actions of the users. For example, if a user has tickets for a given attraction or region, the management system may determine that the user is (or may be) affected by the rule(s)/state(s). In some embodiments, the management system determines these future plans/actions based on ticket systems, reservation systems, and the like. In some embodiments, users can additionally or alternatively specify their future actions, such as by indicating which areas or attractions they intend to visit. Once the set of affected users are identified, the method 400 continues to block 425.

At block 425, the management system selects one of the identified affected users. At block 430, the management system then determines the role of the selected user. In one embodiment, the role is determined based in part on the current and/or future location of the user. For example, users who are currently in the affected area may be classified into a first role (e.g., to receive more urgent alerts), while users who plan to visit in the future are classified as a second/lesser-affected role. In at least one embodiment, the role is based in part on the activities and/or actions the user is engaging (or plans to engage) in. For example, users traveling on foot may be included in a first role, while users on bicycles are classified as a second. Similarly, users working on the roof of a building may be assigned to a different role, compared to users working inside the building. Further, in some embodiments, the role is determined based in part on the employment status of the user (e.g., leader/manager, personnel/employee, and guest/customer).

Once the user's role is determined, the method 400 continues to block 435, where the management system generates one or more actionable instructions for the selected user. In an embodiment, this generation is based in part on the role of the user. Further, in some embodiments, the instruction generation is based in part on the determined relevant rule(s), the determined state(s), and/or the location of the user. For example, leaders may receive one set of instructions, while guests receive another. Similarly, users currently located in the region can receive different instructions than those who plan to visit in the future. Additionally, in some embodiments, users engaging in one activity may receive different instructions from users engaging in other activities. In one embodiment, the instructions are transmitted or otherwise provided to each user as they are generated. In another embodiment, the system can generate instructions for all users, and transmit them simultaneously (or effectively simultaneously) to all.

At block 440, the management system determines whether there is at least one additional affected user that has not yet been evaluated. If so, the method 400 returns to block 425 to select the next user. Otherwise, the method 400 returns to block 405 to continue receiving and evaluating emergent data. In this way, the management system can iteratively and continuously monitor the environment in order to respond to changing conditions as needed in a rapid, automated, and accurate manner.

Figure 5:
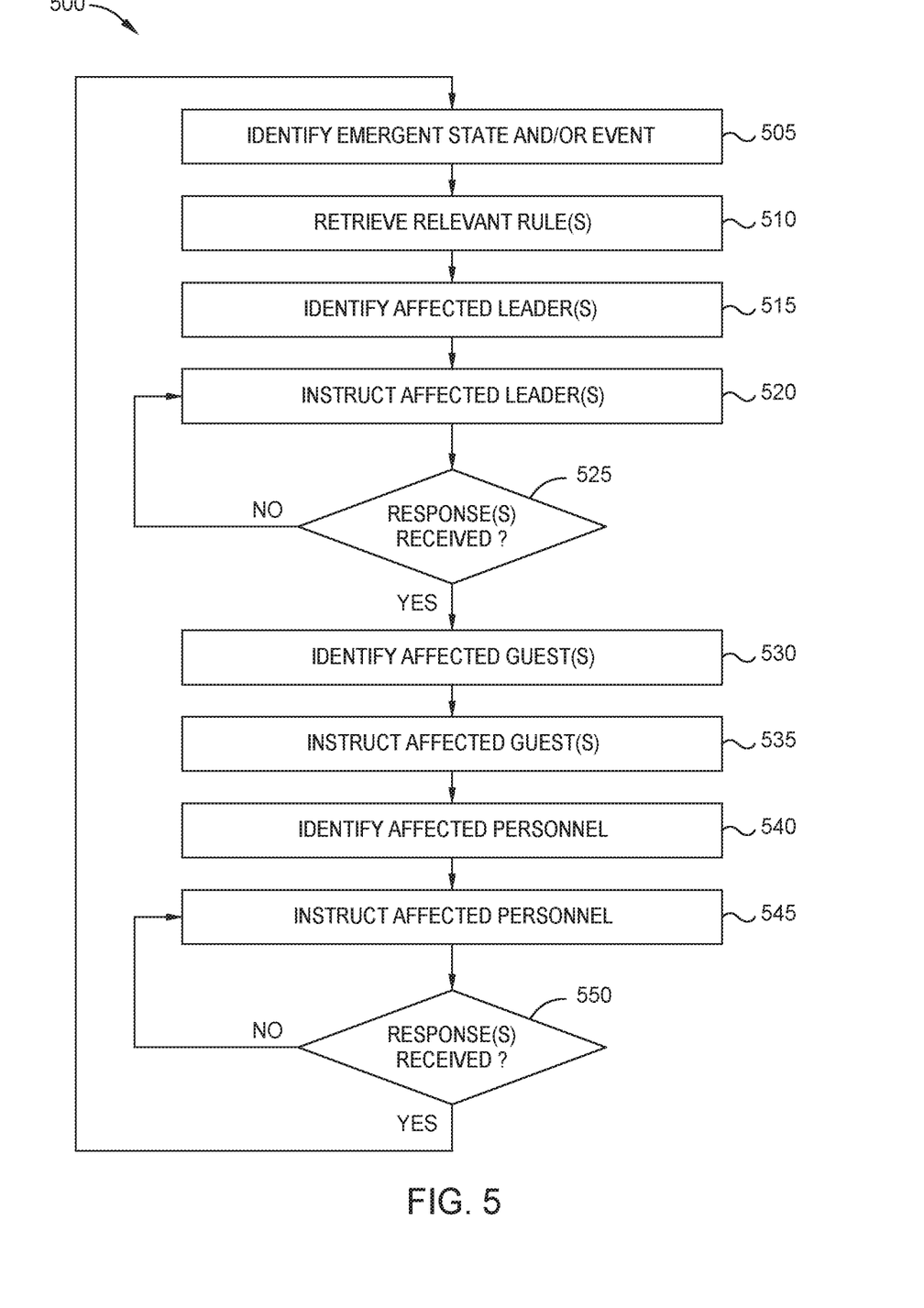
FIG. 5 is a flow diagram illustrating a method for generating and distributing instructions and monitoring responsiveness, according to one embodiment disclosed herein.

FIG. 5 is a flow diagram illustrating a method 500 for generating and distributing instructions and monitoring responsiveness, according to one embodiment disclosed herein. The method 500 describes a differing approach focused on hierarchical enterprises, as compared to the method 400 described above. The method 500 begins at block 505, where a management system identifies one or more emergent states, events, and/or conditions. At block 510, the management system similarly identifies a set of relevant/implicated rules, based on the determined events/states/conditions. The method 500 then continues to block 515, where the management system identifies the affected leader(s).

In an embodiment, the management system identifies the affected leaders based in part on the implicated rules. For example, if the rule is associated with or specifies a particular operation or area, the management system may identify the leader/manager currently in charge of the operation/area. In some embodiments, if the rule is generic (e.g., "if severe weather is detected, all users should shelter in the nearest building"), the management system can identify the relevant leader(s) based on the determined events/conditions (e.g., based on where the emergent situation currently is, or is expected to be). The management system can then identify the leader(s) in charge of this area. Further, in at least one embodiment, the management system identifies the affected leader(s) based on the type of condition. For example, one leader may be responsible for severe weather response in the area, while a second is in charge of ordinary weather conditions, and a third is responsible for injuries and accidents.

Once the relevant leader(s) have been identified, the method 500 proceeds to block 520, where the management system generates and transmits specific instructions to the affected leader(s). At block 525, the management system determines whether a response or acknowledgement has been received from the leader(s). If not, the method 500 loops and continues to transmit instructions/reminders until acknowledgement is received. In some embodiments, the management system waits a predefined period of time between each loop. In at least one embodiment, the management system can additionally or alternatively identify one or more superiors or alternative leaders, and transmit notifications to these alternative/superior users.

Once one or more leader(s) acknowledge/confirm the instructions, the method 500 continues to block 530. In some embodiments, the management system may continue to block 530 even in the absence of response from the leader(s). For example, the event(s) may be associated with a predefined type or urgency (e.g., severe weather) that causes the management system to bypass leader approval before acting. At block 530, the management system identifies the affected guest(s). In various embodiments, this can include identifying guests in the area, guests with plans to visit the area/attraction, and the like.

At block 535, the management system generates and transmits specific instruction to the affected guest(s). In embodiments, this may include providing or suggesting alternative activities, indicating item(s) the guest should consider bringing, specifying location(s) the user should move to, and the like. The method 500 then continues to block 540, where the management system identifies the affected personnel. In embodiments, this may include identifying the employee(s) currently staffing or operating an attraction or area that is affected by the determined condition(s) and/or implicated rule(s).

The method 500 then proceeds to block 540, where the management system generates and provides specific instruction to the affected personnel. In some embodiments, this includes indicating the action(s) to be taken, which can include providing the specific procedures to be followed. That is, in addition to stating that the operation should be shut down, the management system can provide specific steps (or link to the user manual for the attraction) relating to how the closure is to be accomplished. For example, rather than flatly stating that the ride should be closed, the management system can identify and provide granular instruction that is specific to the operation (e.g., "change the display to indicate closure; close the entryway; guide current guests to exit; close the exit doors; power down the attraction; report to manager").

At block 545, the management system determines whether the personnel have responded. In some embodiments, this can include determining whether the personnel have acknowledged the instructions. In one embodiment, this can additionally or alternatively include determining whether the personnel have indicated that one or more of the instructions are being performed or have been completed. If no appropriate response has been received, the method 500 loops at block 545 and continues to send reminders/updates. In some embodiments, this can include waiting a predefined period of time between loops. This time may be specified by a user, and/or indicated in the relevant rule(s). Additionally, in at least one embodiment, the management system may alternatively or additionally escalate the silence to a superior (e.g., after two or more consecutive notifications without response).

Once acknowledgement is received, the method 500 returns to block 505. In this way, the management system can continuously monitor the conditions and respond dynamically to changing situations based on predefined rules. Further, the management system is able to provide specific and granular instruction to each individual based on their particular roles, activities, and locations, rather than blanket instruction. This can include indicating specific locations to proceed to based on the user location, providing specific closure instructions based on the attraction the user is operating, and the like.

Figure 6:
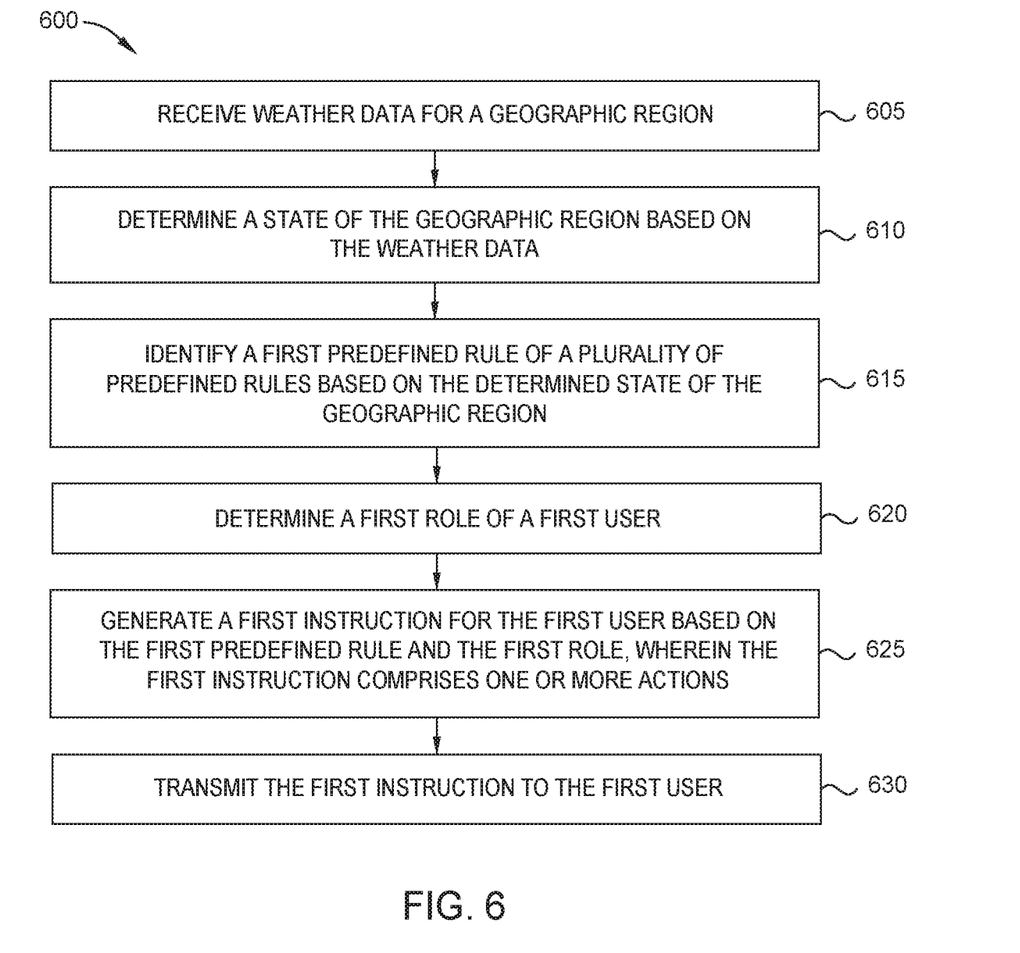
FIG. 6 is a flow diagram illustrating a method for generating and transmitting instructions based on user role and predefined rules, according to one embodiment disclosed herein.

FIG. 6 is a flow diagram illustrating a method 600 for generating and transmitting instructions based on user role and predefined rules, according to one embodiment disclosed herein. The method 600 begins at block 605, where a management system receives weather data for a geographic region. At block 610, the management system determines a state of the geographic region based on the weather data. The method 600 then continues to block 615, where the management system identifies a first predefined rule of a plurality of predefined rules based on the determined state of the geographic region. Further, at block 620, the management system determines a first role of a first user. The method 600 then proceeds to block 625, where the management system generates a first instruction for the first user based on the first predefined rule and the first role, wherein the first instruction comprises one or more actions. At block 630, the management system transmits the first instruction to the first user.

Figure 7:
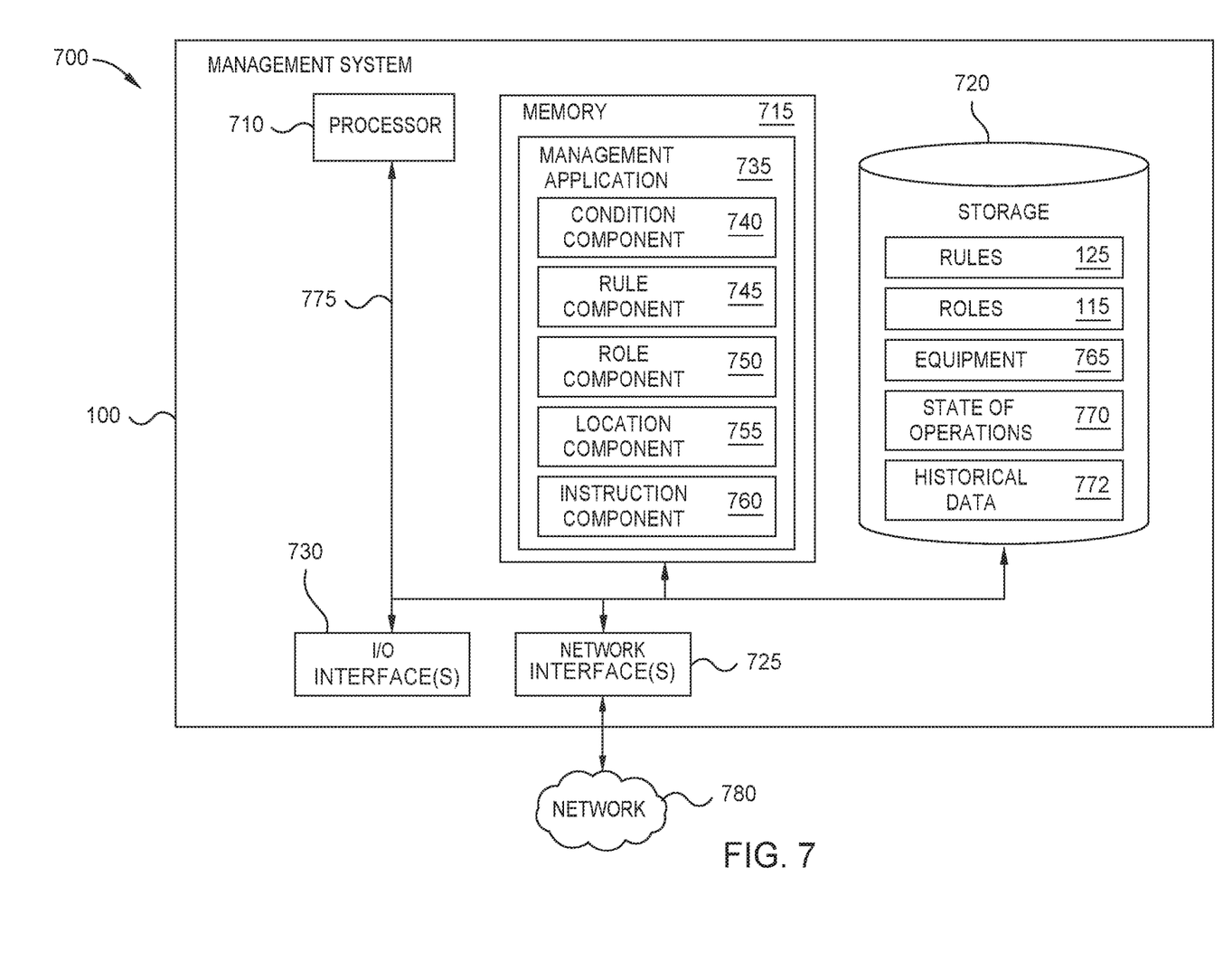
FIG. 7 is a block diagram illustrating a management system configured to generate role-specific responses based on a variety of data, according to one embodiment disclosed herein.

FIG. 7 is a block diagram illustrating a management system configured to generate role-specific responses based on a variety of data, according to one embodiment disclosed herein. Although depicted as a physical device, in embodiments, the Management System 100 may be implemented as a virtual device or service, and/or across a number of devices (e.g., in a cloud environment). As illustrated, the Management System 100 includes a Processor 710, Memory 715, Storage 720, a Network Interface 725, and one or more I/O Interfaces 730. In the illustrated embodiment, the Processor 710 retrieves and executes programming instructions stored in Memory 715, as well as stores and retrieves application data residing in Storage 720. The Processor 710 is generally representative of a single CPU and/or GPU, multiple CPUs and/or GPUs, a single CPU and/or GPU having multiple processing cores, and the like. The Memory 715 is generally included to be representative of a random access memory. Storage 720 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as a mouse, a keyboard, a monitor, a touchscreen, etc.) are connected via the I/O Interface(s) 730. Further, via the Network Interface 725, the Management System 100 can be communicatively coupled with one or more other devices and components (e.g., directly or via the Network 780, which may include the Internet, local network(s), and the like). Additionally, the Network 780 may include wired connections, wireless connections, or a combination of wired and wireless connections. As illustrated, the Processor 710, Memory 715, Storage 720, Network Interface(s) 725, and I/O Interface(s) 730 are communicatively coupled by one or more Buses 775. In embodiments, the Management System 100 may be implemented as a standalone device, as part of a cloud deployment, as an application executing on a user's phone or computer, and the like.

In the illustrated embodiment, the Storage 720 includes a set of Rules 125 and Roles 115, as well as records for Equipment 765, State of Operations 770, and Historical Data 772. Although depicted as residing in Storage 720, in embodiments, these elements may reside in any suitable location. Each of the Rules 125 generally specifies one or more input criteria (e.g., states, conditions, events, and the like) and one or more actions or affects for when the input criteria are satisfied (e.g., closing an operation or area, opening an operation or area, bringing or leaving certain items with the user, going to or leaving specific locations, engaging in particular activities or actions, and the like). Further, the Roles 115 generally indicate the characteristics of one or more users. In one embodiment, the Roles 115 are used to determine whether a given user is a leader/manager, an employee or other personnel, or a guest or customer. In some embodiments, the Roles 115 can further specify additional detail, such as the activities or actions the user engages in. For example, the Roles 115 may indicate the particular areas or attractions an employee controls, the activities the guest is engaging in (or will engage in), and the like.

In one embodiment, the Equipment 765 includes records indicating the operations, attractions, areas, or other equipment relevant for the deployment. For example, the Equipment 765 may include various rides, theaters, shops, and the like. The State of Operations 770 generally includes detail relating to the current and/or future or scheduled state of the Equipment 765. For example, the State of Operations 770 may indicate the status of each operation or attraction (e.g., open or closed), scheduled or planned events (e.g., parades), and the like. In an embodiment, the Historical Data 772 includes records of historical events (e.g., prior weather events) and the resulting actions/instructions. This Historical Data 772 can be utilized to track prior and current responses.

In one embodiment, the Historical Data 772 can assist with creating after-action planning, as well as creating more efficient procedures for the future. For example, a cruise line may wish to review the historical weather impacts for a given route, and makes modifications as needed based on the past weather closures. The enterprise can thus modify future itineraries as needed to reduce the amount or frequency of weather impacts, such as excursion cancelations. This helps not only the cruise line itself, but also drives additional future revenues for the local economies/destinations.

As illustrated, the Memory 715 includes a Management Application 735. Although depicted as software residing in Memory 715, in embodiments, the functionality of the Management Application 735 can be implemented using hardware, software, or a combination of hardware and software. In the illustrated embodiment, the Management Application 735 includes a Condition Component 740, a Rule Component 745, a Role Component 750, a Location Component 755, and an Instruction Component 760. Although depicted as discrete components for conceptual clarity, in embodiments, the operations of the Condition Component 740, Rule Component 745, Role Component 750, Location Component 755, and Instruction Component 760 may be combined or distributed across any number of components and devices.

In an embodiment, the Condition Component 740 generally receives, aggregates, and evaluates emergent data in order to identify states and conditions in one or more areas, which may include the current conditions and/or predicted future conditions. For example, in one embodiment, the Condition Component 740 aggregates weather data (such as wind speed data from one or more anemometers, precipitation data from rain sensors, and/or forecasts from one or more weather services) to determine current and/or future weather conditions. In some embodiments, the Condition Component 740 determines local conditions for any number of defined areas or regions.

In the illustrated embodiment, the Rule Component 745 receives the determined condition(s), and identifies the relevant Rules 125 that are implicated by the condition(s). This allows the Management Application 735 to specifically identify affected region(s) and operation(s), as well as the action(s) to be taken in response to changing conditions. In embodiments, the Role Component 750 is utilized to determine the role of a given user of the system (e.g., based on the Roles 115).

In an embodiment, the Location Component 755 is used to determine the current and/or future location(s) of each relevant user. This can have a significant impact on the instructions/information transmitted to each user. The Instruction Component 760 generates specific and actionable instructions for each affected user based on the identified Rule(s) 125, Role(s) 115, locations, and/or conditions. This allows the Management Application 735 to generate dynamic and role-specific instructions to individual users, to facilitate appropriate and immediate action in response to changing conditions.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving weather data for a geographic region;
determining, by operation of one or more computer processors, a state of the geographic region based at least in part on the weather data, wherein the state of the geographic region comprises an operational state of the geographic region, and wherein the operational state indicates a future operating state of equipment in the geographic region;
identifying a first predefined rule of a plurality of predefined rules based on the determined state of the geographic region, wherein the first predefined rule specifies to perform one or more actions to modify the future operating state of the equipment, based on the state of the geographic region;
determining a first role of a first user;
generating a first instruction for the first user based on the first predefined rule and the first role, wherein the first instruction comprises the one or more actions; and
transmitting the first instruction to the first user.

2. The method of claim 1, the method further comprising:
identifying a period of time specified by the first predefined rule; and
upon determining that the period of time has elapsed, determining whether a response has been received from the first user; and
upon determining that no response has been received from the first user, generating a second instruction for the first user based on the first predefined rule.

3. The method of claim 2, the method further comprising:
identifying a second user with a predefined hierarchical relationship to the first user;
generating a third instruction for the second user based on the first predefined rule; and
transmitting the third instruction to the second user.

4. The method of claim 1, wherein determining the first role of the first user comprises:
identifying one or more activities the first user is engaged in or intends to engage in at a future time; and
classifying the first user into the first role based on the one or more activities.

5. The method of claim 1, wherein the one or more actions comprise at least one of:
(i) closing an operation to guests;
(ii) opening an operation to guests;
(iii) bringing a specific item with them;
(iv) going to a specified location, wherein the specified location is determined based on a current location of the first user; or
(v) engaging in one or more alternative activities, wherein the one or more alternative activities are identified based on one or more activities the first user is currently engaged in or intends to engage in at a future time.

6. The method of claim 1, the method further comprising identifying a plurality of users affected by the state of the geographic region, and, for each respective user of the plurality of users;
determining a respective role of the respective user;
generating a respective instruction for the respective user based on the first predefined rule and the respective role, wherein the respective instruction comprises one or more actions; and
transmitting the respective instruction to the respective user.

7. The method of claim 1, further comprising:
determining a predicted future state of the geographic region based at least in part on the weather data;
identifying a second predefined rule of the plurality of predefined rules based on the determined state and the predicted future state of the geographic region; and
generating a second instruction for the first user based on the second predefined rule and the first role.

8. A non-transitory computer-readable medium containing computer program code that, when executed by operation of one or more computer processors, performs an operation comprising:
receiving weather data for a geographic region;
determining a state of the geographic region based at least in part on the weather data, wherein the state of the geographic region comprises an operational state of the geographic region, and wherein the operational state indicates a future state of equipment in the geographic region;
identifying a first predefined rule of a plurality of predefined rules based on the determined state of the geographic region, wherein the first predefined rule specifies to perform one or more actions to modify the future state of the equipment, based on the state of the geographic region;
determining a first role of a first user;
generating a first instruction for the first user based on the first predefined rule and the first role, wherein the first instruction comprises the one or more actions; and
transmitting the first instruction to the first user.

9. The computer-readable medium of claim 8, the operation further comprising:
identifying a period of time specified by the first predefined rule; and
upon determining that the period of time has elapsed, determining whether a response has been received from the first user; and
upon determining that no response has been received from the first user, generating a second instruction for the first user based on the first predefined rule.

10. The computer-readable medium of claim 9, the operation further comprising:
identifying a second user with a predefined hierarchical relationship to the first user;
generating a third instruction for the second user based on the first predefined rule; and
transmitting the third instruction to the second user.

11. The computer-readable medium of claim 8, wherein determining the first role of the first user comprises:
identifying one or more activities the first user is engaged in or intends to engage in at a future time; and
classifying the first user into the first role based on the one or more activities.

12. The computer-readable medium of claim 8, wherein the one or more actions comprise at least one of:
(i) closing an operation to guests;
(ii) opening an operation to guests;
(iii) bringing a specific item with them;
(iv) going to a specified location, wherein the specified location is determined based on a current location of the first user; or
(v) engaging in one or more alternative activities, wherein the one or more alternative activities are identified based on one or more activities the first user is currently engaged in or intends to engage in at a future time.

13. The computer-readable medium of claim 8, the operation further comprising identifying a plurality of users affected by the state of the geographic region, and, for each respective user of the plurality of users:
determining a respective role of the respective user;
generating a respective instruction for the respective user based on the first predefined rule and the respective role, wherein the respective instruction comprises one or more actions; and
transmitting the respective instruction to the respective user.

14. The computer-readable medium of claim 8, the operation further comprising:
determining a predicted future state of the geographic region based at least in part on the weather data;
identifying a second predefined rule of the plurality of predefined rules based on the determined state and the predicted future state of the geographic region; and
generating a second instruction for the first user based on the second predefined rule and the first role.

15. A system, comprising:
one or more computer processors; and
a memory containing a program which when executed by the one or more computer processors performs an operation, the operation comprising:
receiving weather data for a geographic region;
determining a state of the geographic region based at least in part on the weather data, wherein the state of the geographic region comprises an operational state of the geographic region, and wherein the operational state indicates a future state of equipment in the geographic region;
identifying a first predefined rule of a plurality of predefined rules based on the determined state of the geographic region, wherein the first predefined rule specifies to perform one or more actions to modify the future state of the equipment, based on the state of the geographic region;
determining a first role of a first user;
generating a first instruction for the first user based on the first predefined rule and the first role, wherein the first instruction comprises the one or more actions; and
transmitting the first instruction to the first user.

16. The system of claim 15, the operation further comprising:
identifying a period of time specified by the first predefined rule; and
upon determining that the period of time has elapsed, determining whether a response has been received from the first user; and
upon determining that no response has been received from the first user, generating a second instruction for the first user based on the first predefined rule.

17. The system of claim 16, the operation further comprising:
identifying a second user with a predefined hierarchical relationship to the first user;
generating a third instruction for the second user based on the first predefined rule; and
transmitting the third instruction to the second user.

18. The system of claim 15, wherein determining the first role of the first user comprises:
identifying one or more activities the first user is engaged in or intends to engage in at a future time; and
classifying the first user into the first role based on the one or more activities.

19. The system of claim 15, wherein the one or more actions comprise at least one of:
(i) closing an operation to guests;
(ii) opening an operation to guests;
(iii) bringing a specific item with them;
(iv) going to a specified location, wherein the specified location is determined based on a current location of the first user; or
(v) engaging in one or more alternative activities, wherein the one or more alternative activities are identified based on one or more activities the first user is currently engaged in or intends to engage in at a future time.

20. The system of claim 15, the operation further comprising identifying a plurality of users affected by the state of the geographic region, and, for each respective user of the plurality of users:
determining a respective role of the respective user;
generating a respective instruction for the respective user based on the first predefined rule and the respective role, wherein the respective instruction comprises one or more actions; and
transmitting the respective instruction to the respective user.

* * * * *

UNITED STATES PATENT AND TRADEMARK OFFICE
CERTIFICATE OF CORRECTION

PATENT NO. : 11,520,832 B2
APPLICATION NO. : 16/875664
DATED : December 6, 2022
INVENTOR(S) : Gregory Brooks Hale et al.

It is certified that error appears in the above-identified patent and that said Letters Patent is hereby corrected as shown below:

In the Claims

In Column 20, Line 6, in Claim 6, delete "users;" and insert -- users: --.

Signed and Sealed this
Twenty-eighth Day of March, 2023

*Katherine Kelly Vidal*

Katherine Kelly Vidal
*Director of the United States Patent and Trademark Office*